United States Patent [19]

Venkatasetty

[11] 3,867,106

[45] Feb. 18, 1975

[54] MAGNETIC THIN FILM DATA STORAGE DEVICE AND METHOD OF MAKING

[75] Inventor: Hanumanthaya V. Venkatasetty, Burnsville, Minn.

[73] Assignee: Honeywell, Inc., Minneapolis, Minn.

[22] Filed: Dec. 26, 1973

[21] Appl. No.: 428,462

[52] U.S. Cl. .................... 29/183.5, 29/194, 75/170, 204/43 T, 340/174 NA

[51] Int. Cl. ..... B23p 3/00, C23b 5/32, G11c 11/02

[58] Field of Search ............ 75/170; 29/194, 183.5; 204/43 T; 340/174 NA

[56] References Cited

UNITED STATES PATENTS

| | | | |
|---|---|---|---|
| 2,730,491 | 1/1956 | Moline et al. | 204/43 T |
| 3,093,557 | 6/1963 | Cope et al. | 204/43 T |
| 3,265,596 | 8/1966 | Castellani et al. | 204/43 T |

*Primary Examiner*—G. L. Kaplan

*Attorney, Agent, or Firm*—Charles G. Mersereau

[57] ABSTRACT

An improved corrosion-resistant thin film for use in a magnetic memory data storage device combines high coercive force with reduced internal stress. The film is of a nickel, cobalt, indium ternery composition electro-deposited from an alkaline pyrophosphate bath containing an aromatic sulfonic acid type additive.

9 Claims, 1 Drawing Figure

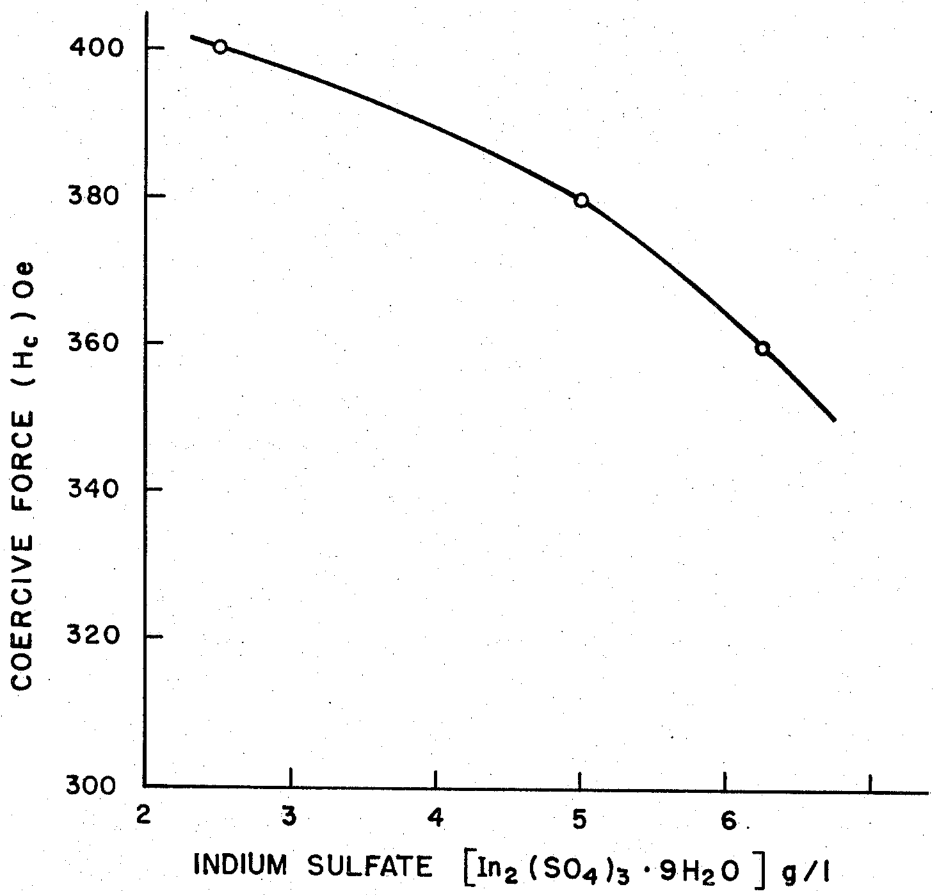
COERCIVE FORCE (Hc) Oe
400
380
360
340
320
300
2
3
4
5
6
INDIUM SULFATE [In2 (SO4)3 · 9H2O] g/l

MAGNETIC THIN FILM DATA STORAGE DEVICE AND METHOD OF MAKING

BACKGROUND OF THE INVENTION

1. Field of the Invention

The present invention relates generally to magnetic thin films and, more particularly, to an improved film for use in magnetic thin film data storage devices.

2. Description of the Prior Art

A highly developed technology has evolved in the field of thin magnetic films of metallic materials for use as memory elements and the like in the computer industry. The principle alloys which have been used in the past include nickel-iron alloys of the Permalloy type, and iron-nickel-cobalt alloy or an iron-nickel-cobalt alloy containing phosphorous. As the sophistication of the computer art has increased so has the need for better magnetic thin film materials which are capable of faster read and write speeds and much higher bit packing densities.

One important problem that has been encountered in prior art attempts to achieve the required higher packing densities in modern magnetic data storage devices is related to the interference among adjacent stored bits. This problem occurs because each bit is in the form of a localized magnetic condition created in one portion of the memory element (normally digitized as a 1 or a 0); and these bits have a tendency to creep. As the bit is interrogated repeatedly, the magnetic domain limits to the bit tend to become broadened out and ultimately begin to overlap into those of adjacent bits thereby adversely affecting and interfering with the information stored in such adjacent bits. This phenomenon, known as the creep effect, results initially in a reduced signal to noise ratio and may ultimately result in enough interference to destroy the information stored in such bits.

By creating magnetic thin films having a high coercive force, $H_c$, the creep effect may be minimized and allow more compact storage of information. It has been found that the value of $H_c$ should be at least 300 Oe. to reduce the creep effect to a reasonable level. The coercive force, however, is also related to the value of the current required to read the stored bit. As the value of $H_c$ is increased, the required read current is also increased. Thus, if the coercive force is too high (above approximately 500 Oe.) destructive readout results because the required read current is so high that the localized magnetic condition of the bit is destroyed. The most desirable range of $H_c$ values is from about 350 Oe. to about 450 Oe.

It has also been discovered that if a magnetic thin film of the type described contains high internal stresses, desired magnetic properties are also adversely affected. It is therefore also necessary that such a magnetic thin film be deposited in a manner which reduces internal stresses as much as possible. A particularly persistent problem which has been encountered in the prior attempts to improve the desired characteristics of magnetic thin films has been the tendency to corrode in the combinations of elements utilized to achieve a magnetic thin film having both the high $H_c$ and the relatively low internal stress required.

In the prior art, attempts have been made to overcome this corrosion by alloying cobalt or cobalt-nickel films with elements from Group VIB i.e., chromium, molybdenum and tungsten. This approach is described in an article by Luborsky entitled "High Coercive Force Films of Cobalt-Nickel with Additions of Group VA and VIB Elements," *IEEE Transactions on Magnetics*, VOL. MAG-6, No. 3, 502–506 (Sept. 1970). Of the possible alloying agents which have been used to reduce corrosion in magnetic thin films, only tungsten appears to have been somewhat successful. One serious drawback associated with tungsten, however, is the difficulty encountered in attempting to electroplate tungsten along with cobalt or cobalt-nickel from an electrochemical bath due to the much higher electrode reduction potential of tungsten in comparison with the other two metals. That, as discussed in more detail below, makes it much more difficult to control the electrodeposition process and percentage composition of the deposited layer.

SUMMARY OF THE INVENTION

According to the present invention, basically nickel-cobalt magnetic thin films may be made highly corrosion resistant without sacrificing any of the other desired properties, including low internal stress in the deposit and a high coercive force value. This is accomplished by alloying a small amount of indium with the basic nickel-cobalt layer. The electrodeposited Ni-Co-In ternery film of the present invention contains approximately from about 40 to about 43 weight per cent nickel, from about 52 to 56 weight per cent cobalt and from about 2 to 6 weight per cent indium.

In order to achieve the desired high $H_c$ and low internal stress, in the preferred embodiment the Ni—Co—In films are electrodeposited from an electrolytic bath containing approximately 37.5 g/l nickel sulfate, approximately 52.5 g/l cobalt sulfate, 2.5 to 6.25 g/l indium sulfate, approximately 12.5 g/l potassium pyrophosphate, approximately 6.25 g/l ammonium chloride, approximately 0.25 g/l sodium lauryl sulfate and an organic additive from the class consisting of aromatic sulfonic acids in substituted aromatic sulfonic acids, normally, approximately 1.5 g/l of 1, 3, 6 naphthalene trisulfonic acid. Sufficient ammonium hydroxide is added to achieve a bath pH of 10–11. The use of the aromatic sulfonic acid organic additive allows retention of high coercive force in the final film with minimum stress. The use of a potassium pyrophosphate in the bath provides an inorganic complexing agent charge carrying medium which allows the use of higher current densities than those which can be utilized with organic complexing and charge carrying media such as the citrate ions often employed in the prior art.

BRIEF DESCRIPTION OF THE DRAWING

The single FIGURE depicts a curve of the coercive force, $H_c$ v. the concentration of indium in the electrolytic bath for a constant cobalt to nickel ratio of about 1.4:1.

DESCRIPTION OF THE PREFERRED EMBODIMENT

Magnetic thin films prepared for use in memory elements in data storage devices normally consist of a non-magnetic metallic substrate, usually a beryllium-copper or phosphor-bronze composition over which the zero magnetostrictive magnetic layer is deposited, normally by electrolytic or electroless deposition. The film material properties including the stability of the information stored as data therein is highly dependent on both the composition of the final magnetic thin film and the particular mode of deposition of that film. Because physical, chemical and electrical properties of such films present a highly complex interrelationship in which even a slight change in any one factor is likely to influence one or more of other properties of the film, great care must be taken in controlling the deposition of the film.

As mentioned above, one of the important goals in the art of producing magnetic thin films for data storage devices has been to eliminate corrosion in the film subsequent to its deposition without compromising desirable properties of the film, i.e., low internal stress and high coercive force. The improved corrosion resistance of the films of the present invention has been brought about by the incorporation of an amount of indium in the basically nickel-cobalt thin film. Nickel-cobalt-indium films which contain from about 2 per cent to about 6 per cent indium by weight have been found to possess good corrosion resistance and to possess coercivities which are close to those achieved by nickel-cobalt films.

As indicated above, the closest prior art solution to the corrosion problem in the magnetic thin film data storage devices has been inclusion of an amount of tungsten along with the nickel and cobalt in the film. Control of the electrodeposition of tungsten, however, in the presence of cobalt and nickel has been found to be quite difficult. The tungsten is normally added to the electrochemical bath in the form of sodium tungstate and nickel, cobalt and indium are added in the sulfate form. A comparison of the reduction potentials of the elements involved is as follows:

| ELEMENT | ION | REDUCTION POTENTIAL (VOLTS) |
|---|---|---|
| Nickel | $Ni^{-2}$ | 0.250 |
| Cobalt | $Co^{-2}$ | 0.277 |
| Indium | $In^{-3}$ | 0.342 |
| Tungsten | $W^{-6}$ | 1.05 |

As can be seen from the table, the much higher reduction potential of tungsten requires that the plating process have a much higher plate potential and at that higher plate potential the nickel and cobalt will be depleted at a much higher rate than the tungsten. This, of course, means that the concentration in the electrochemical bath of the tungsten ions in relation to the other species must be very carefully controlled in order to achieve the intended percentage composition in the final film. The much higher negative reduction potential of tungsten in comparison to indium also indicates that it will oxidize after such electrodeposition at a much higher rate than the indium of the present invention.

As can also be seen from the table the reduction potential of indium is very much closer to those of nickel and cobalt. In practice it has indeed been found that indium is far easier to plate as desired in combination with nickel and cobalt.

Thus, one distinct advantage of the present invention in the use of indium as a corrosion inhibiting constituent of nickel-cobalt films is that it not only produces films which exhibit excellent corrosion resisting properties with little effect on the other desirable properties of the film but also indium simplifies the complexity of the plating process.

It has been found that internal stresses may be reduced and controlled by utilizing a special electrolytic deposition process which includes utilizing an electrolytic bath containing pyrophosphate ions and certain specialized sulfur-containing organic additives. Examples of such organic additives include tolune p-sulfonic acid, benzene m-disulfonic acid, tolune p-sulfonamide, naphthalene 1, 3, 6-trisulfonic acid and naphthalene 1, 5-disulfonic acid. In addition to the above, it has been found that pH of the electrolytic solution must be controlled in order to produce the best results. Baths using these additives have been used in the plating of nickel and nickel-iron alloys for the purpose of reducing internal stresses while retaining high coercive force in the resulting films.

Several illustrations of plating baths and conditions utilized to plate the compositions of the preferred embodiment appear below.

ILLUSTRATION I

In accordance with one embodiment of the invention electrodeposition was carried on utilizing the following bath:

| COMPONENT | AMOUNT |
|---|---|
| Nickel Sulfate ($NiSo_4 6H_2O$) | 30 g |
| Cobalt Sulfate ($CoSo_4 . 7H_2O$) | 42 g |
| Indium Sulfate[$In_2(So_4)_3 . 9 H_2O$] | 2 g |
| Ammonium Chloride ($NH_4Cl$) | 5 g |
| Sodium Lauryl Sulfate | 0.2 g |
| 1, 3, 6 Naphthalene Trisulfonic Acid | 1.2 g |
| Potassium Pyrophosphate ($K_4P_2O_7$) | 10 g |
| Ammonium Hydroxide ($NH_4OH$) | Sufficient to adjust the pH of the bath to pH 11 |
| Total Volume | 800 ml |

The above electrolytic bath utilizing a platinum anode and a fixed anode-cathode separation distance was used to plate a beryllium-copper substrate measuring 15 by 24 mm. The bath was operated at a temperature of approximately 35°C and a current density of about 90 $mA/cm^2$ was employed. Twenty minutes of plating utilizing the above bath produced a sample specimen having a plated thin film thickness of approximately 10,000 A and an $H_c$ of approximately 420 Oe. The other desirable properties were also excellent.

Forty minutes of plating utilizing the above bath produced a sample having a plated thin film thickness of approximately 13,000 A and an $H_c$ of approximately 390 Oe. and the other desirable properties remained good.

Several other samples were run utilizing the bath of Illustration I with similar results. Each of the samples produced had a smooth microsurface with grain size having good uniformity, texture and free of pinholes. It was found, however, that if the above bath were used immediately after its preparation, the surfaces of the plated samples produced were very dark in appearance; whereas, if the plating bath were allowed to stand for a period of several hours, (overnight, for example) the plated sample was silvery bright and smooth appearing. The color of the finished sample, however, appeared to have no effect on the other properties.

ILLUSTRATION II

An electroplating bath was made up as in Illustration I utilizing three grams of indium sulfate instead of the two grams of Illustration I. The plating conditions including the anode-cathode separation, temperature, current density and size of the substrate to be plated were identical to those utilized in Illustration I.

Four such samples were run for a period of forty minutes under the above conditions and the resulting plated composition yielded an $H_c$ of approximately 360 Oe. for each sample. The average plated thickness (based on sample weight gain) was 13,000 A.

Other samples were also run utilizing concentrations of indium sulfate up to approximately 5 grams (6.25 g/l).

The results of the several experiments involved in which only the concentration of indium sulfate was changed with all other conditions and parameters remaining the same appears in the figure which depicts a curve of the resultant coercive force, $H_c$, versus the concentration of indium sulfate in the electrodeposition bath. It can readily be seen from that figure that although the value of $H_c$ drops somewhat as the concentration of indium sulfate is increased, it is still well within the range required for operation of magnetic memory devices.

Table I, below shows the range of bath parameters found for successful plating in accordance with the present invention.

The thin film deposits of the invention have shown corrosion resistance superior to anything previously observed. It appears that such films indeed exhibit better long term stability in magnetic memory devices because of this corrosion resistance.

The embodiments of the invention in which an exclusive property or right is claimed are defined as follows:

1. In a magnetic thin film data storage device having a non-magnetic metallic substrate and magnetic thin film for data storage overlaying said substrate, the improvement wherein said magnetic thin film is a ternery alloy containing from about 40 per cent to about 43 per cent nickel, from about 52 per cent to about 56 per cent cobalt and from about 2 per cent to about 6 per cent indium.

2. The thin film magnetic data storage device of claim 1, wherein said magnetic thin film is electrodeposited from an alkaline electrochemical bath containing organic additives from a group consisting of aromatic sulfonic acids and substituted aromatic sulfonic acids and an inorganic additive consisting of an alkali metal pyrophosphate.

3. The magnetic thin film data storage device as claimed in claim 2 wherein said organic additive is one selected from a group consisting of
4 amino - 1 naphthalene sulfonic acid
8 amino - 1, 3, 6 naphthalene trisulfonic acid
2, 7 naphthalene disulfonic acid
2 naphthalene sulfonic acid
1, 3 benzene disulfonic acid.

TABLE I

| COMPONENT OR CONDITION | RANGE | OPTIMUM |
|---|---|---|
| Nickel Sulfate ($NiSo_4 .6H_2O$) | 30–75 g/l | 37.5 g/l |
| Cobalt Sulfate ($CoSo_4.7H_2O$) | 33–90 g/l | 52.5 g/l |
| Indium Sulfate [$In_2(So_4)_3.9\ H_2O$] | 2.5–6.25 g/l | 3 g/l |
| Ammonium Chloride ($NH_4Cl$) | 5–20 g/l | 6.25 g/l |
| Sodium Lauryl Sulfate | 0.2–1 g/l | 0.3 g/l |
| 1, 3, 6 Naphthalene Trisulfonic Acid | 1–5 g/l | 1.5 g/l |
| Potassium Pyrophosphate ($K_4P_2O_7$) | 10–60 g/l | 12.5 g/l |
| Ammonium Hydroxide ($NH_4OH$) Sufficient to adjust to following pH | 10–12 pH | 11 pH |
| Temperature | 25–40 °C | 35 °C |
| Current Density | 50–200 mA/cm² | ~100 mA/cm² |

A typical bath composition may be comprised of from about 7 g/l to about 20 g/l of nickelous ion, from about 7 g/l to about 30 g/l of cobaltous ion, from about .4 g/l to about 2.5 g/l of indium (111) ion, from about 5 g/l to about 26 g/l of pyrophosphate ion, from about 1 g/l to about 3 g/l ammonium ion, from about 0.5 g/l to about 3 g/l of an organic additive selected from the group consisting of aromatic sulfonic acids and substituted aromatic sulfonic acids and sufficient hydroxyl to adjust the pH of the solution in the range of 10 to 11.

Table II, below, is a table of calculated percentage composition values for weight per cent of nickel, cobalt and indium in the deposited film when only the $In_2(So_4)_3 \cdot 9\ H_2O$ concentration is changed. In Table II, $NiSo_4 \cdot 6H_2O$ = 37.5 g/l and $CoSo_4 \cdot 7H_2O$ = 52.5 g/l. The method of calculation and stress within the plated layer.

Use of other organic media in controlled quantity in the plating bath such as the 1, 3, 6 naphthalene trisulfonic acid or others mentioned above aids in preserving the high coercive force, $H_c$, and minimizing the internal stress characteristics. These particular organic compounds do not act as charge carriers nor do they become in any way part of the deposited layer.

4. The magnetic thin film data storage device of claim 2 wherein said alkali metal pyrophosphate is potassium pyrophosphate.

5. The magnetic thin film data storage device as claimed in claim 2 wherein said thin film is plated from an electroplating bath comprising from about 30 g/l to about 75 g/l nickelous sulfate, from about 33 g/l to about 90 g/l cobaltous sulfate, from about 2.5 g/l to about 6.25 g/l indium (111) sulfate, from about 10 g/l to about 60 g/l potassium pyrophosphate, from about 0.2 g/l to about 1.0 g/l sodium lauryl sulfate, from about 5 g/l to about 20 g/l ammonium chloride and from about 1 g/l to about 5 g/l 1, 3, 6 naphthalene trisulfonic acid and sufficient ammonium hydroxide to adjust the bath to pH 10–11.

6. The magnetic thin film data storage device as claimed in claim 1 wherein the thickness of said thin film is in the range of from about 10,000 A to about 13,000 A.

7. The magnetic thin film data storage device of claim 1 wherein said magnetic thin film has a coercive force of from about 350 oersteds to about 450 oersteds.

8. A method of electrodepositing a ferromagnetic metallic thin film on a non-magnetic metallic substrate, comprising the steps of:

immersing said non-magnetic metallic substrate surface as a cathode in an aqueous electrolytic bath, said bath comprising from about 7 g/l to about 20 g/l of nickelous ion, from about 7 g/l to about 30 g/l cobaltous ion, from about 0.4 g/l to about 2.5 g/l indium (111) ion, from about 5 g/l to about 26 g/l pyrophosphate ion, from about 1 g/l to about 3 g/l ammonium ion, from about 0.5 g/l to about 3 g/l of an organic additive selected from the group consisting of aromatic sulfonic acids and substituted aromatic sulfonic acids and sufficient hydroxyl to adjust the pH of the solution in the range of pH 10 to pH 11, passing a current through said bath sufficient to plate a film of nickel-cobalt-indium ternery composition on said cathode and removing said plated cathode from said bath.

9. A method as claimed in claim 8, wherein said nickelous, cobaltous, indium (111) ions are added in the form of the sulfate, wherein said pyrophosphate ion is added in the form of potassium pyrophosphate, wherein said ammonium ion is added in the form of ammonium chloride and wherein said organic additive is 1, 3, 6 naphthalene trisulfonic acid trisodium salt.

* * * * *